Figure 1:
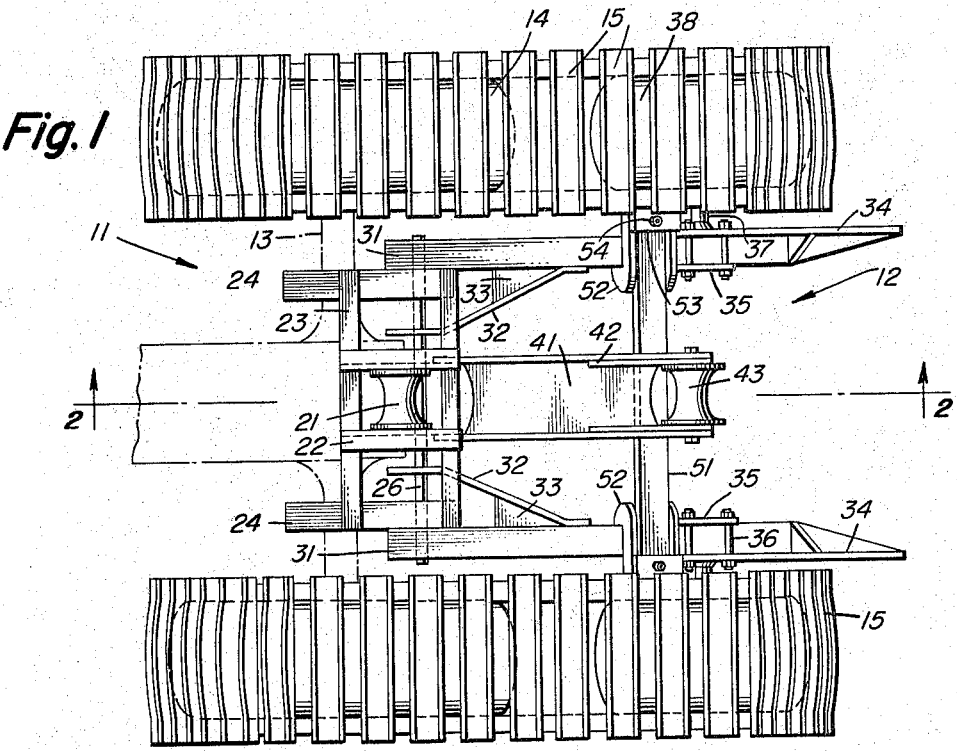

Nov. 15, 1966  J. E. BLONSKY  3,285,626
ARCHED TOWING MACHINE FOR STABILIZING TRACTORS
Filed July 27, 1964  3 Sheets-Sheet 1

INVENTOR
Joseph E. Blonsky

BY *Marion P. Lelong*

AGENT

Nov. 15, 1966  J. E. BLONSKY  3,285,626
ARCHED TOWING MACHINE FOR STABILIZING TRACTORS
Filed July 27, 1964  3 Sheets-Sheet 2
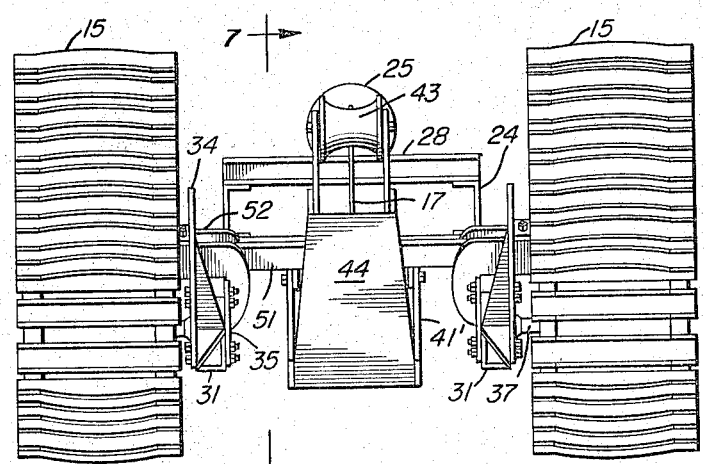
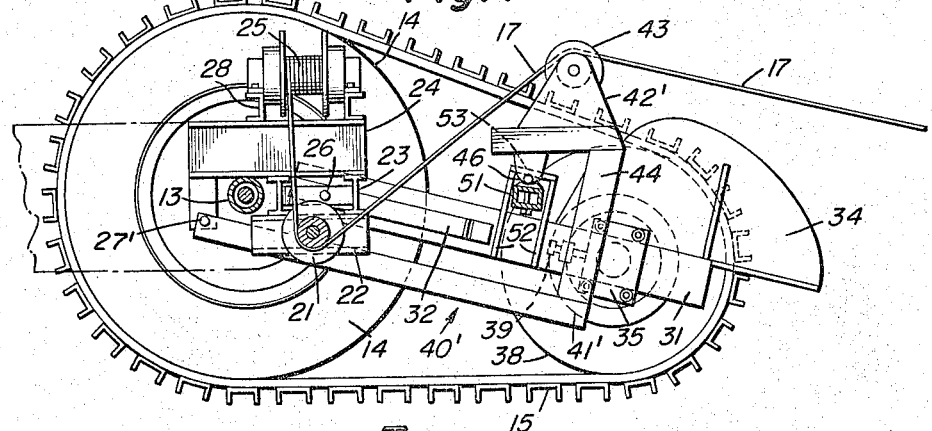
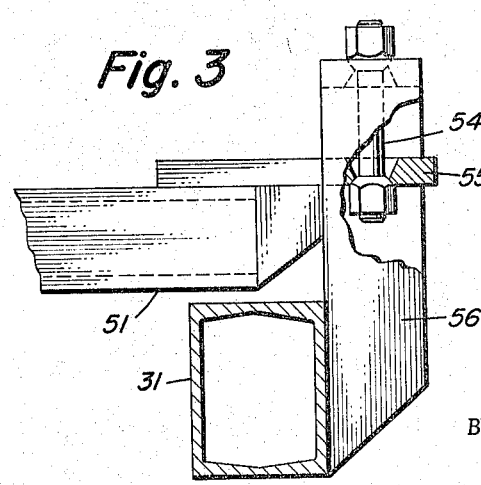
INVENTOR
Joseph E. Blonsky
BY
AGENT

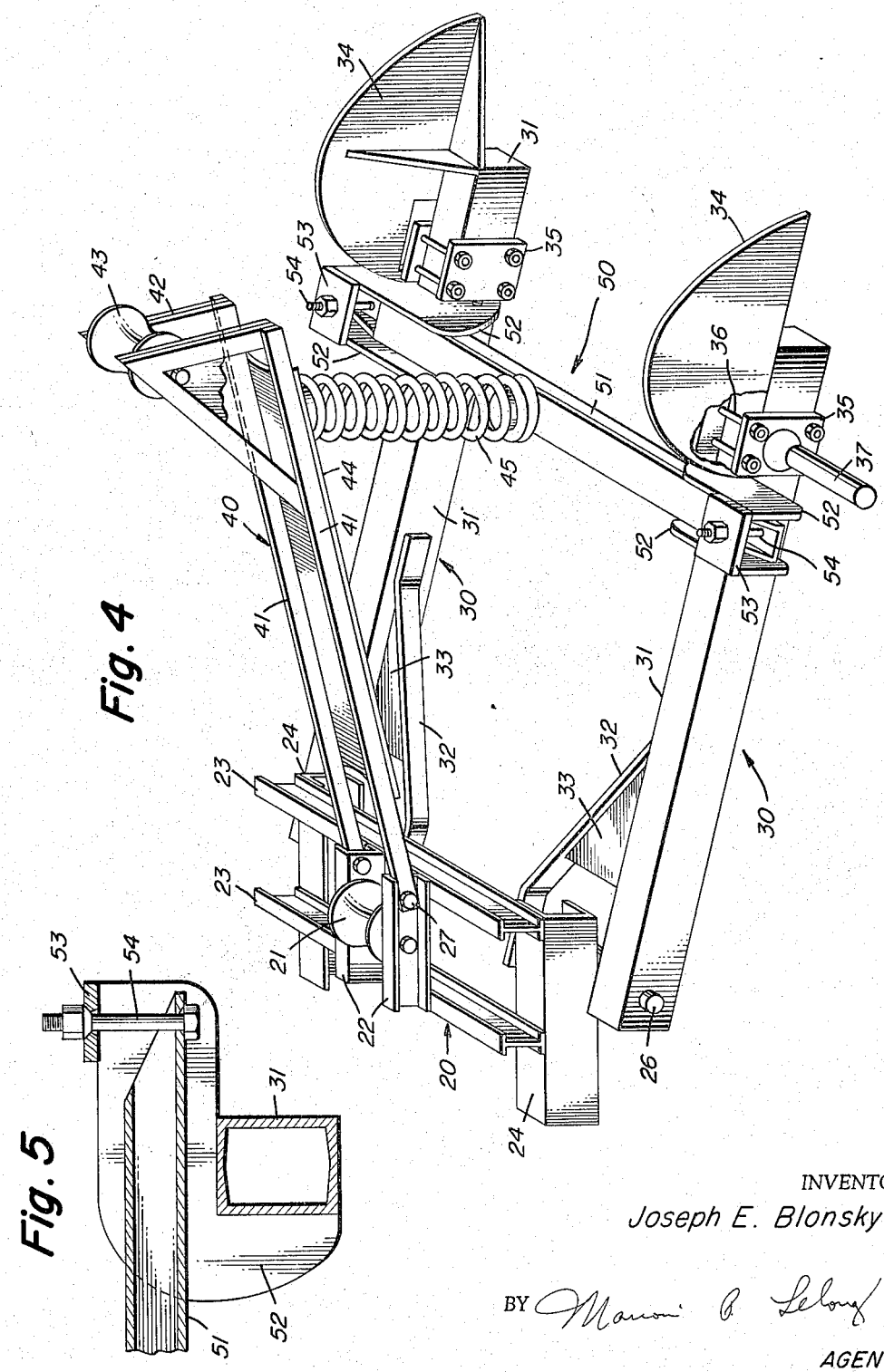

United States Patent Office 3,285,626
Patented Nov. 15, 1966

3,285,626
ARCHED TOWING MACHINE FOR
STABILIZING TRACTORS
Joseph E. Blonsky, Summerville, S.C., assignor to West
Virginia Pulp and Paper Company, New York, N.Y.,
a corporation of Delaware
Filed July 27, 1964, Ser. No. 385,410
3 Claims. (Cl. 280—480)

This invention relates to tractors used for pulling heavy loads and particularly relates to a tractor stabilizing machine of the logging arch type for increasing the safety and pulling power of relatively light tractors when used for towing heavy objects such as logs.

Light farm tractors are commonly utilized for pulpwood logging operations in the southeastern United States. The loads involved are often very great, particularly when skidding large logs in wooded terrain, so that the danger of tipping backward is always present. In event of turnover, it is not uncommon that the operator is injured or even killed.

It is the general object of this invention to provide means for preventing backward tipping of light tractors engaged in heavy-duty hauling whereby the safety of the operator is enhanced.

A typical tractor with which the instant invention may be selectively combined comprises an engine, an engine-supporting frame, a front wheel assembly, a power-transmission means comprising transmission, differential and rear axle, a power take-off means, large rear driving wheels, and a pulling hitch.

The arched towing machine of this invention is essentially an improved version of the familiar logging arch which has long been used for elevating the forward ends of towed logs. U.S. 2,058,473, for example, gives an example of prior art devices. This arched towing machine for stabilizing tractors in its simplest form comprises an idler wheel assembly, a shock roller assembly, and a shock-absorbing means. As used herein, forward and rearward designations for this invention are the same as would normally be applied to the tractor.

The embodiments of the invention shown in the drawings obtain torsional rigidity principally by using dual idler wheel assemblies, connected by a walking beam, which possess sufficient lateral flexibility for use in wooded areas. Two variations of the shock roller assembly are shown in the drawings, one having a roller beam generally above the wheel beams and another having an L-shaped roller beam beneath the wheel beams and rising behind the walking beam to form a generally vertical impact member so that the forward end of a log can be elevated above stump level and into proximity with this impact member. Other embodiments may readily be constructed in accordance with the design considerations herein set forth and in fulfillment of the object stated hereinbefore.

Figure 2:
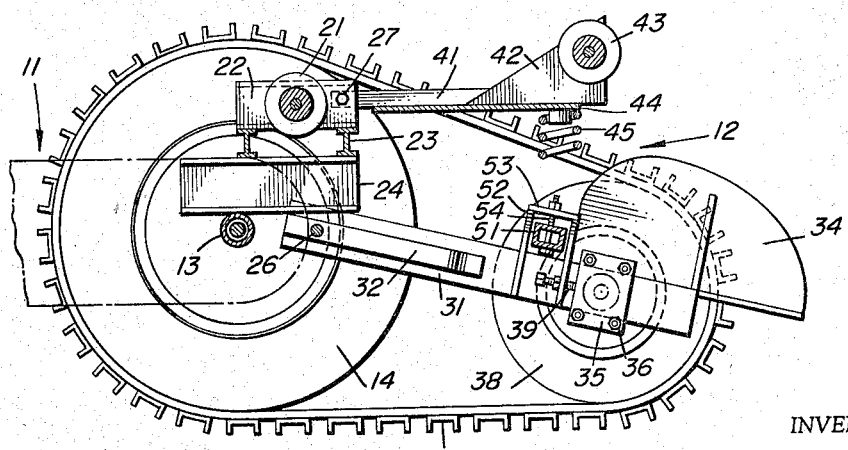

In the drawings:
FIGURE 1 is a plan view of the rear end of a tractor and of the arched towing machine.
FIGURE 2 is a sectional side elevation of the arched towing machine taken along the lines 2-2 in FIGURE 1.
FIGURE 3 is a rear elevation, partially cutaway, of a movable mounting for the lever beam.
FIGURE 4 is an isometric view of the arched towing machine without idler wheels.
FIGURE 5 is a section elevation, similar to FIGURE 3, of a movable mounting for the lever beam.
FIGURE 6 is a rear elevation which shows the invention equipped with an L-shaped roller beam.
FIGURE 7 is a cross section, taken along the lines of 7—7 in FIGURE 6, which also shows the embodiment having the L-shaped roller beam.

Referring particularly to the reference numbers with arrows in FIGURES 1 and 4, the arched towing machine 12 is hingeably attached to the rear end 11 of a tractor in a typical utility combination. As may be clearly seen in FIGURE 4, the arched machine 12 for stabilizing tractors comprises the load roller assembly 20, the idler wheel assemblies 30, the shock roller assembly 40, and the lever beam assembly 50.

Referring to reference numbers which are used for the same individual parts in all of the drawings, the load roller assembly 20 comprises roller, transverse, and axle members 22, 23, and 24 which are rigidly attached to each other and rotatably support load roller 21. Axle members 24 are rigidly attached to the tractor rear end 11 at a convenient position such as the top of the tractor axle 13, and transverse members 23 and roller members 22 are rigidly attached to the axle members 24 in any configuration desired. A load roller 21 is rotatably attached to the roller members 22, as shown in FIGURES 1, 2, 4, and 7. An idler wheel assembly shaft 26 is also fastened to the axle mounting members 24 at a convenient position, such as beneath the members 24 and rearward of the tractor axle 13, as shown in FIGURES 1, 2, 4, and 7.

The load roller assembly 20, as shown in the drawings, is a useful and preferred embodiment which essentially functions as a means of positioning the load roller 21 to obtain a desired load counter-torque and as a means of hingeably attaching the idler wheel assemblies 30 and shock roller assembly 40 to the rear end of a tractor. Any structural arrangement enabling these means to be accomplished may be considered within the purview of this invention.

The idler wheel assemblies 30 are hingeably and independently attached to the idler wheel assembly shaft 26. Each idler wheel assembly 30 comprises a torsion beam 31, stay-bar 32, gusset plate 33, mud guard 34, spindle support plates 35, spindle bolts 36, idler wheel spindle 37, idler wheel 38, and idler wheel adjustment bolt 39. The spindle support plates 35 are slideably clamped upon each torsion beam 31 with bolts 36 which pass through slots in the mud guards 34 above the beam 31.

Attached to each outer spindle support plate 35 is an idler wheel spindle 37 upon which an idler wheel 38, equipped with a pneumatic rubber tire having rubber lugs, is rotatably mounted. During operation of the tractor stabilizing machine of the instant invention, the rubber tires on idler wheels 38 are usually partially encompassed by metal belts, herein termed tracks 15, which also pass over the rubber tires having rubber lugs on tractor drive wheels 14; these tracks 15 are engaged by the rubber lugs on the tires of wheels 14 and 38 and thus cooperatively transmit traction forces to the ground along their entire horizontal portions.

An idler adjustment bolt 39 is aligned with each torsion beam 31 so that its rear end abuts against the forward edge of the adjacent inner spindle support plate 35. Each bolt 39 is threaded and passes through a threaded stud member which is rigidly fastened, as by welding, to the beam 31, as shown in FIGURES 2 and 7, respectively. By screwing a bolt 39 against a plate 35, the tension in the tracks 15 can be adjusted as desired.

The lever beam assembly 50 comprises level beam 51, overhang bracket 52, overhang suspension plate 53, and suspension bolt 54, as shown in FIGURES 4 and 5, or lever beam 51, lever beam suspension plate 55, suspension bolt 54, and upright bracket 56, as shown in FIGURE 3. The overhang brackets 52 or the upright brackets 56 are rigidly attached to the torsion beams 31. Each plate 53 or 55 has a hole, fashioned as a ball joint, through which loosely hangs a freely-movable suspension bolt 54, according to either support modification shown in FIGURES 3 and 5. The lever beam 51 is suspended at each end from a bolt 54. Either modification of the support means for the lever beam assembly 50, as shown alternatively in FIGURES 3 and 5, permits the assembly 50 to move pivotably up and down freely as either idler wheel 38 drops into ruts or passes over high spots such as small logs or stumps.

The shock roller assembly 40, 40' is hingeably attached to the load roller assembly 20 by shock roller assembly shaft 27, 27'. The shock roller assembly 40, 40' comprises roller beam 41, 41', roller supports 42, 42', rotatably-mounted shock roller 43 and a shock-absorbing means, such as a spring 45 shown in FIGURES 2 and 4. Other means of absorbing shock, such as a hydraulic cylinder or gas accumulator, can be substituted for a spring.

Two embodiments of the shock roller assembly are shown in the drawings; FIGURES 1, 2, and 4 show the overhead embodiment, and FIGURES 6 and 7 show the underslung embodiment. Shock roller assembly 40 is the overhead embodiment and has a straight roller beam 41 which is above the idler wheel assemblies 30 and hingeably cooperates therewith under restraint of the spring 45 and shock roller assembly shaft 27. Shock roller assembly 40' is the underslung embodiment and has an L-shaped shock roller beam 41', a shock roller assembly shaft 27', an impact plate 44, universal joint 46, roller supports 42', and shock roller 43. The roller beam 41' is hingeably attached by the shock roller assembly shaft 27, as shown in FIGURE 7, to the load roller assembly 20 at a point beneath, and forward of, the idler wheel assembly shaft 26; the long side of its L passes beneath the torsion beams 31 and is jointed to the generally upright short side of the L just beyond the lever beam 51. The short and upright side of this L is faced to the rearward with a heavy steel impact plate 44 to withstand pounding contact from the forward end of the load and is surmounted by roller supports 42' upon which shock roller 43 is rotatably mounted.

The shock roller assembly 40', as the underslung embodiment, may be supported by the lever beam 51 through a shock-absorbing means, such as a spring 45 or a hydraulic cylinder, which may be mounted between the bottom of the roller supports 42' and the lever beam 51, as in the overhead embodiment. However, because the load is intended to be elevated above the bottom of the lever beam 51 so that the butt cannot be impaled upon stumps or other immovable objects, shock loading and a consequently dangerous stopping torque are largely eliminated. When using an underslung embodiment, the spring 45 can consequently be replaced by a relatively non-resilient shock-absorbing means, such as by a suitable universal joint 46, particularly if backed by a flexible mounting means such as a resilient rubber pad.

The overhead shock roller assembly 40 is suitably used with a relatively extended towing cable 17 for dragging logs along the ground; it can be satisfactorily used without a winch at relatively low speeds for hauling felled trees to a cutting deck, for instance. The underslung shock roller assembly 40' is generally preferred and is particularly satisfactory for towing large logs at relatively high speeds because the forward end of a towed log can be lifted completely off the ground by relatively shortened cable 17 so that the butt thereof is approximately in contact with the impact plate 44 before forward movement begins.

I claim:
1. An arched towing machine which is movably attached to the rear of a light tractor used in heavy towing, comprising:
 (a) a pair of idler wheel assemblies, each assembly comprising:
  (1) a torsion beam which is movably attached to the rear of the tractor,
  (2) an adjustably-mounted spindle, projecting perpendicularly therefrom,
  (3) an idler wheel rotatably mounted on the spindle,
 (b) a lever beam assembly, comprising:
  (1) a mounting means rigidly attached to each torsion beam and
  (2) a lever beam pivotably suspended at each end from a mounting means, and
 (c) a shock roller assembly which comprises:
  (1) a shock-absorbing means attached to and resting upon the lever beam,
  (2) a rigid shock roller beam which is above said idler wheel assembly, centrally aligned therewith, and in hinged relationship thereto, said roller beam being attached to and resting upon said shock-absorbing means, and
  (3) a shock roller which is rotatably attached to the rear end of the roller beam.

2. An arched towing machine for stabilizing a light tractor used in heavy towing, comprising:
 (a) a load roller assembly, rigidly attached to the rear end of said tractor, that includes a rotatably attached load roller, over which a tow cable passes to the load being towed, and an idler wheel assembly shaft,
 (b) a pair of idler wheel assemblies that are hingeably and independently attached to the idler wheel assembly shaft, each idler wheel assembly comprising a torsion beam and an idler wheel which is rotatably attached to the torsion beam, and
 (c) a lever beam assembly that transversely connects the idler wheel assemblies, comprising:
  (1) a mounting means that is rigidly attached to each torsion beam, and
  (2) a lever beam that is pivotally suspended at each end from one of the mounting means, whereby the lever beam moves up and down freely, and
 (d) a shock roller assembly, comprising:
  (1) a rigid roller beam that is hingeably attached at its forward end to the load roller assembly,
  (2) shock roller supports that are rigidly attached to the rearward end of the roller beam,
  (3) a shock roller that is rotatably attached to the shock roller supports, and
  (4) a shock-absorbing means that connects the shock roller supports to the lever beam at the middle of said lever beam and supports the rearward end of said shock roller assembly.

3. The arched towing machine of claim 2 wherein the rigid roller beam comprises:
 (1) a substantially horizontal long member that is hingeably attached to the load roller assembly and passes generally beneath said torsion beams, and
 (2) a substantially vertical short member that is rigidly attached to the rear end of said long member, rises rearwardly of the lever beam assembly, and is faced to the rearward with a heavy steel impact plate, the shock roller supports being rigidly attached to the upper end of said short member.

References Cited by the Examiner
UNITED STATES PATENTS

| | | | |
|---|---|---|---|
| 1,503,620 | 8/1924 | Zesbaugh | 305—29 |
| 2,643,012 | 6/1953 | Wahl | 214—85.1 |
| 2,913,223 | 11/1959 | Le Tourneau | 254—139.1 |
| 3,077,338 | 2/1963 | Bergerson | 254—139.1 |

FOREIGN PATENTS

| | | |
|---|---|---|
| 460,062 | 5/1928 | Germany. |
| 102,187 | 7/1963 | Norway. |

BENJAMIN HERSH, *Primary Examiner.*

R. J. JOHNSON, *Assistant Examiner.*